US012066091B2

(12) United States Patent
Yanagihara et al.

(10) Patent No.: US 12,066,091 B2
(45) Date of Patent: Aug. 20, 2024

(54) VEHICLE DRIVE DEVICE (71) Applicants: AISIN CORPORATION, Kariya (JP); MITSUBISHI JIDOSHA KOGYO KABUSHIKI KAISHA, Tokyo (JP)

(72) Inventors: Yuki Yanagihara, Kariya (JP); Takayoshi Kato, Kariya (JP); Isao Fujishima, Kariya (JP); Naoki Takahashi, Tokyo (JP); Kiminobu Terao, Tokyo (JP); Takuya Ogasawara, Okazaki (JP); Yosuke Morimoto, Okazaki (JP)

(73) Assignees: AISIN CORPORATION, Kariya (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/246,363

(22) PCT Filed: Sep. 24, 2021

(86) PCT No.: PCT/JP2021/034994
§ 371 (c)(1),
(2) Date: Mar. 23, 2023

(87) PCT Pub. No.: WO2022/071091
PCT Pub. Date: Apr. 7, 2022

(65) Prior Publication Data
US 2023/0358306 A1 Nov. 9, 2023

(30) Foreign Application Priority Data
Sep. 29, 2020 (JP) .................................. 2020-163737

(51) Int. Cl.
*F16H 57/021* (2012.01)
*B60K 1/02* (2006.01)
(Continued)

(52) U.S. Cl.
CPC ............. *F16H 57/021* (2013.01); *B60K 1/02* (2013.01); *F16H 57/029* (2013.01);
(Continued)

(58) Field of Classification Search
CPC .... F16H 57/021; F16H 57/029; F16H 57/037; F16H 2057/02034; F16H 2057/02052; F16H 2057/0216
See application file for complete search history.

(56) References Cited

U.S. PATENT DOCUMENTS

| 2007/0107960 A1* | 5/2007 | Takami | .................. F16H 3/728 |
| | | | 180/65.6 |
| 2020/0284338 A1* | 9/2020 | Suyama | .................. B60L 15/20 |
| 2022/0290749 A1 | 9/2022 | Mizutani et al. | |

FOREIGN PATENT DOCUMENTS

| EP | 3988817 A1 | 4/2022 |
| JP | 2010048380 A | 3/2010 |

(Continued)

OTHER PUBLICATIONS

International Search Report (PCT/ISA/210) with translation and Written Opinion (PCT/ISA/237) mailed on Nov. 22, 2021, by the Japanese Patent Office as the International Searching Authority for International Application No. PCT/JP2021/034994. (9 pages).

(Continued)

*Primary Examiner* — Edwin A Young
(74) *Attorney, Agent, or Firm* — Buchanan Ingersoll & Rooney PC (57) ABSTRACT

A case for a vehicle drive device includes a first case part having a first support part, a second case part having a first part, and a third case part having a second part. The second case part is joined to the first case part on an axial-direction first side, the third case part is joined to the first case part on an axial-direction second side, a first rotating body and a first input member are placed between the first support part and (Continued)

the first part in an axial direction, in a supported state by the first support part and the first part, and a second rotating body and a second input member are placed between the first support part and the second part in the axial direction, in a supported state by the first support part and the second part.

12 Claims, 3 Drawing Sheets

(51) Int. Cl.
*F16H 57/029* (2012.01)
*F16H 57/037* (2012.01)
*F16H 57/02* (2012.01)

(52) U.S. Cl.
CPC . *F16H 57/037* (2013.01); *F16H 2057/02034* (2013.01); *F16H 2057/02052* (2013.01); *F16H 2057/0216* (2013.01)

(56) References Cited

FOREIGN PATENT DOCUMENTS

| | | |
|---|---|---|
| JP | 2018048685 A | 3/2018 |
| JP | 2019094930 A | 6/2019 |

OTHER PUBLICATIONS

Extended European Search Report dated Feb. 16, 2024, issued in corresponding European Application No. 21875393.7. (17 pages).

* cited by examiner

VEHICLE DRIVE DEVICE

TECHNICAL FIELD

The present disclosure relates to a vehicle drive device including a first drive force source, a second drive force source, a first output member drivingly connected to a first wheel, a second output member drivingly connected to a second wheel, a power transmission device, and a case in which the first drive force source, the second drive force source, the first output member, the second output member, and the power transmission device are accommodated.

BACKGROUND ART

Japanese Unexamined Patent Application Publication No. 2018-48685 (Patent Literature 1) discloses an example of a vehicle drive device including a first drive force source, a second drive force source, a first output member, a second output member, a power transmission device, and a case in which the first drive force source, the second drive force source, the first output member, the second output member, and the power transmission device are accommodated (reference signs provided in parentheses in Background Art are those described in the patent literature). In the vehicle drive device (1), the case is constituted by five members of a first motor housing (4L) having an inner wall (4cL), a second motor housing (4R) having an inner wall (4cR), a first cover member having an outer wall (4bL), a second cover member having an outer wall (4bR), and a speed reducer housing (9) having a partition wall (11).

Each of an electric motor (2L) as the first drive force source and an electric motor (2R) as the second drive force source is placed between the inner wall (4cL, 4cR) and the outer wall (4bL, 4bR) in the axial direction in a state where the each of the electric motor (2L) and the electric motor (2R) is supported by the inner wall (4cL, 4cR) and the outer wall (4bL, 4bR). Further, a motor shaft (5a, 5a) as an input member configured to rotate integrally with a rotor (5, 5) as a rotating body of each of the electric motors (2L, 2R) is placed between the inner wall (4cL, 4cR) and the partition wall (11) in the axial direction in a state where the motor shaft (5a, 5a) is supported by the inner wall (4cL, 4cR) and the partition wall (11). In the vehicle drive device (1) in Patent Literature 1, the case is configured such that the first cover member having the outer wall (4bL), the first motor housing (4L), the speed reducer housing (9), the second motor housing (4R), and the second cover member having the outer wall (4bR) are joined to each other in the axial direction in the order described above.

CITATION LIST

Patent Literature

Patent Literature 1: Japanese Unexamined Patent Application Publication No. 2018-48685

SUMMARY

Technical Problem

However, in a case where the case is configured as described in Patent Literature 1, the five members are joined to each other to configure the case, and therefore, four joined parts in total are present, and the four joined parts are provided at respective positions all exposed to outside. Accordingly, the four joined parts all require respective sealing members to seal alignment parts where the five members are joined to each other, thereby resulting in that a manufacturing cost for the vehicle drive device tends to be high.

In view of the above, it is desirable to reduce the number of parts that require sealing in a case for a double-axis vehicle drive device including two drive force sources and to reduce a manufacturing cost for the vehicle drive device.

Solution to Problem

A vehicle drive device achieved in consideration of the above description is a vehicle drive device including a first drive force source including a first rotating body, a second drive force source including a second rotating body, a first output member drivingly connected to a first wheel, a second output member drivingly connected to a second wheel, and a case in which the first drive force source, the second drive force source, the first output member, and the second output member are accommodated. The first drive force source and the second drive force source are placed on a first axis. The first output member and the second output member are placed on a second axis different from the first axis. The first axis and the second axis are placed in parallel to each other. When a direction perpendicular to the first axis and the second axis is taken as an axis perpendicular direction, the case includes a first case part having a first support part extending in the axis perpendicular direction, a second case part having a first part that is a part extending in the axis perpendicular direction, and a third case part having a second part that is a part extending in the axis perpendicular direction. The second case part is joined to an axial-direction first side of the first case part. The third case part is joined to an axial-direction second side of the first case part that is opposite from the axial-direction first side. The first rotating body and a first input member configured to rotate integrally with the first rotating body are placed between the first support part and the first part in an axial direction in a state where the first rotating body and the first input member are supported by the first support part and the first part. The second rotating body and a second input member configured to rotate integrally with the second rotating body are placed between the first support part and the second part in the axial direction in a state where the second rotating body and the second input member are supported by the first support part and the second part.

With this configuration, the case constituted by three members can be formed such that the three members are joined at two joining surfaces of a joining surface between the first case part and the second case part and a joining surface between the first case part and the third case part. That is, the number of parts that require sealing in the case (CS) can be reduced. Further, since the first rotating body and the first input member are supported between the first case part and the second case part and the second rotating body and the second input member are supported between the first case part and the third case part, the case is constituted by a small number of members, and the rotating bodies of the drive force sources and the input members can be supported by the case appropriately. As such, with this configuration, it is possible to reduce the number of parts that require sealing in a case for a double-axis vehicle drive device including two drive force sources and to reduce a manufacturing cost for the vehicle drive device.

Further features and advantages of the vehicle drive device are made clear from the following description on exemplary and nonlimiting embodiments to be described with reference to the drawings.

DESCRIPTION OF EMBODIMENTS

Figure 1:
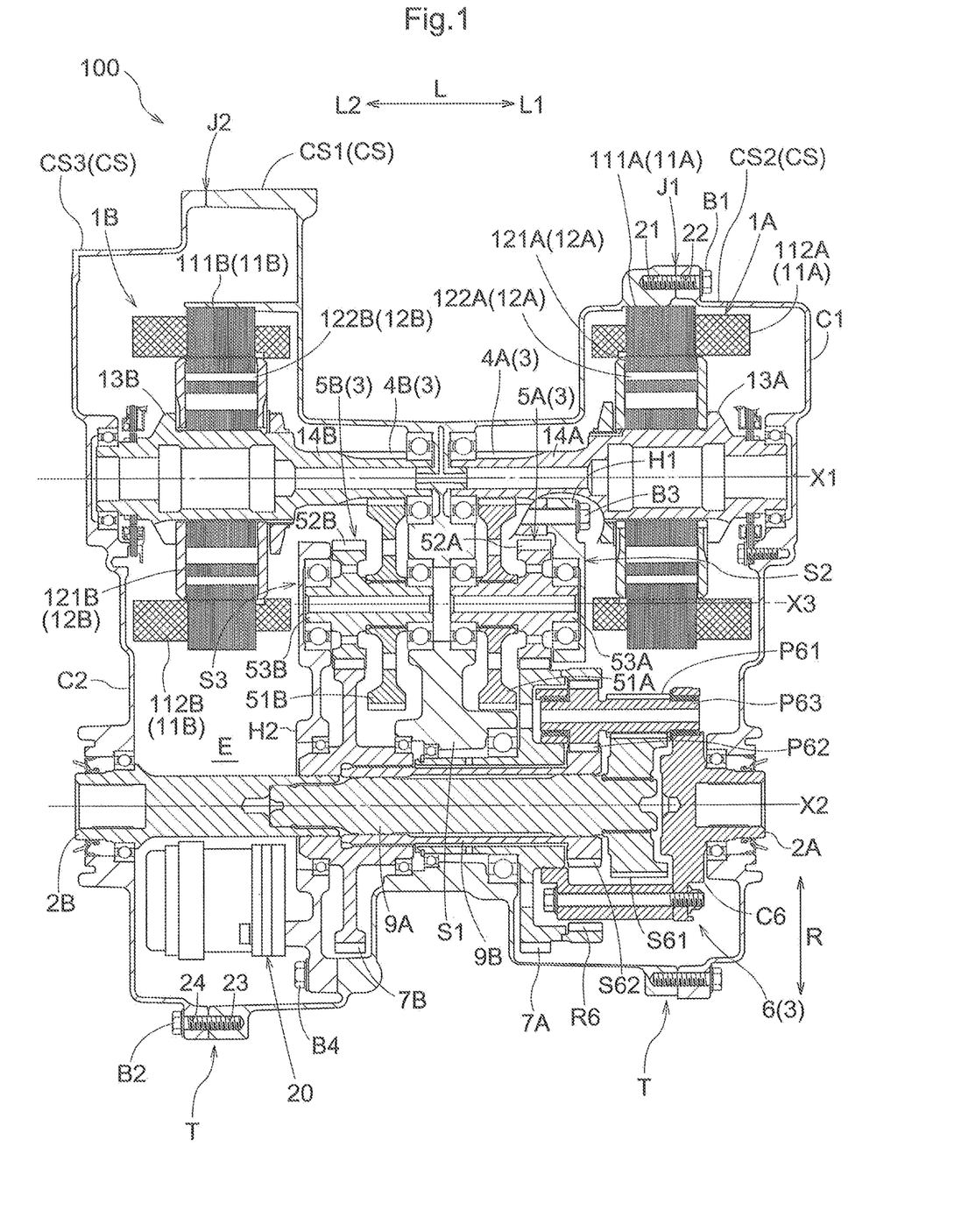
FIG. 1 is a sectional view along an axial direction of a vehicle drive device.
Figure 2:
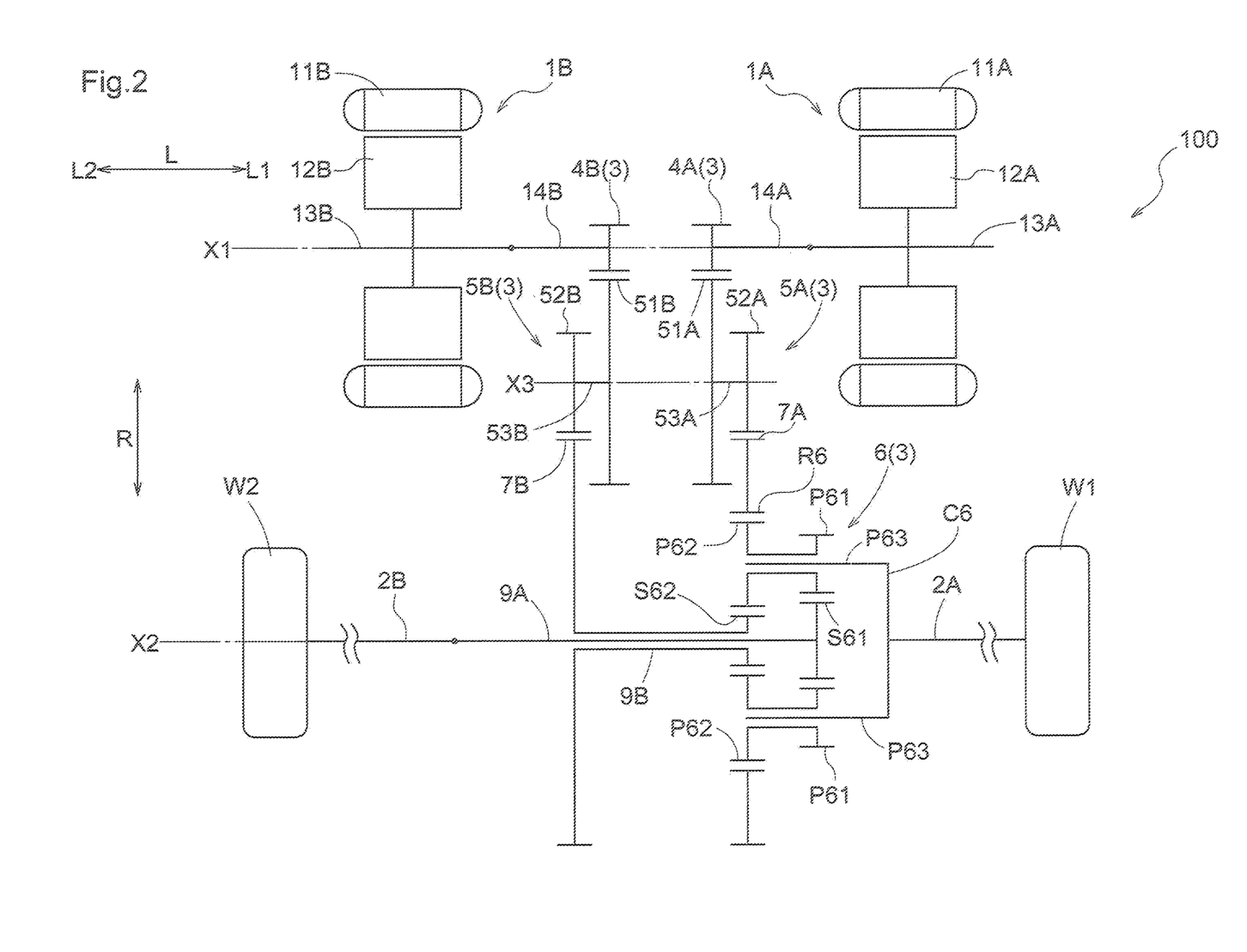
FIG. 2 is a skeleton diagram of the vehicle drive device.

The following describes an embodiment of a vehicle drive device with reference to the drawings. As illustrated in FIGS. 1, 2, a vehicle drive device 100 includes a first rotary electric machine 1A, a second rotary electric machine 1B, a first output member 2A drivingly connected to a first wheel W1, a second output member 2B drivingly connected to a second wheel W2, a power transmission device 3, and a case CS in which the first rotary electric machine 1A, the second rotary electric machine 1B, the first output member 2A, the second output member 2B, and the power transmission device 3 are accommodated. Note that the first output member 2A and the second output member 2B are partially exposed to outside the case CS.

Here, in the present application, "drivingly connected" indicates a state where two rotating elements are connected such that drive force is transmittable and includes a state where the two rotating elements are connected to rotate integrally or a state where the two rotating elements are connected such that drive force is transmittable via one or two or more transmission members. The transmission members include various members configured to transmit rotation at the same speed or by changing the speed, e.g., a shaft, a gear mechanism, a belt, a chain, and so on. Note that the transmission members may include an engaging device configured to selectively transmit rotation and drive force, e.g., a frictional engagement device, a meshing type engaging device, and so on.

The first rotary electric machine 1A corresponds to a "first drive force source," and the second rotary electric machine 1B corresponds to a "second drive force source." Note that the first rotary electric machine 1A and the second rotary electric machine 1B have a function as a motor (an electric machine) configured to generate power upon receipt of electric power and a function as a generator (an electric generator) configured to generate electric power upon receipt of power. The first rotary electric machine 1A and the second rotary electric machine 1B are placed on a first axis X1. More specifically, both a first rotor 12A that is a rotating body of the first rotary electric machine 1A and a second rotor 12B that is a rotating body of the second rotary electric machine 1B rotate around the first axis X1. Further, the first output member 2A and the second output member 2B are placed on a second axis X2 different from the first axis X1. More specifically, both the first output member 2A and the second output member 2B rotate around the second axis X2.

The power transmission device 3 transmits torque of the first rotary electric machine 1A to at least the first output member 2A and transmits torque of the second rotary electric machine 1B to at least the second output member 2B. In the present embodiment, the power transmission device 3 is configured to transmit torque obtained by combining the torque of the first rotary electric machine 1A and the torque of the second rotary electric machine 1B to the first output member 2A and the second output member 2B in a distributed manner. Accordingly, the power transmission device 3 includes a first input gear 4A (a first gear) configured to rotate integrally with the first rotor 12A, a second input gear 4B (a second gear) configured to rotate integrally with the second rotor 12B, a first counter gear mechanism 5A and a second counter gear mechanism 5B that are both placed on a third axis X3 different from the first axis X1 and the second axis X2, and a planetary gear mechanism 6 serving as a differential gear mechanism and placed on the second axis X2. Note that, in the present embodiment, the first input gear 4A and the second input gear 4B are placed on the first axis X1. The planetary gear mechanism 6 is placed on the second axis X2.

Here, the first axis X1, the second axis X2, and the third axis X3 are imaginary axes different from each other and are placed in parallel to each other. Further, in the following description, a direction parallel to the first axis X1, the second axis X2, and the third axis X3 is referred to as an "axial direction L" of the vehicle drive device 100. In the axial direction L, a side where the first rotary electric machine 1A is placed relative to the second rotary electric machine 1B is referred to as an "axial-direction first side L1," and its opposite side is referred to as an "axial-direction second side L2." Further, a direction (an axis perpendicular direction) perpendicular to each of the axes (X1, X2, X3) is referred to as a "radial direction R" based on the each of the axes. Note that, in a case where it is not necessary to distinguish which axis is taken as a reference or a case where it is apparent which axis is taken as a reference, the direction may be just referred to as the "radial direction R."

As illustrated in FIG. 1, the case CS is constituted by three members of a first case part CS1 having a first support part S1 extending in the radial direction R, a second case part CS2 having a first part C1 (a first extending part) that is a part extending in the radial direction R, and a third case part CS3 having a second part C2 (a second extending part) that is a part extending in the radial direction R. The second case part CS2 is joined to the axial-direction first side L1 of the first case part CS1, and the third case part CS3 is joined to the axial-direction second side L2 of the first case part CS1 that is opposite from the axial-direction first side L1.

As illustrated in FIG. 1, the first case part CS1 and the second case part CS2 are fastened to each other by a first fastening member B1 (here, a male screw) at projecting parts T projecting outwardly in the radial direction R from respective case outer peripheral walls. A first insertion hole 22 through which the first fastening member B1 penetrates is formed in the projecting part T of the second case part CS2, and a first female-screw hole 21 with which the first fastening member B1 is engaged threadedly is formed in the projecting part T of the first case part CS1. The first case part CS1 and the second case part CS2 are brought into contact with each other, and the first fastening member B1 is inserted into the first insertion hole 22 along the axial direction L from the axial-direction first side L1 toward the axial-direction second side L2 such that the first fastening member B1 is engaged threadedly with the first female-screw hole 21. Hereby, a first joining surface J1 is formed in a close contact manner such that the first case part CS1 and the second case part CS2 are joined to each other. Note that an insertion hole through which the first fastening member B1 penetrates may be formed in the projecting part T of the first case part CS1, and a female-screw hole with which the first fastening member B1 is engaged threadedly may be formed in the projecting part T of the second case part CS2 such that the first fastening member B1 is inserted along the axial direction L from the axial-direction second side L2 toward the axial-direction first side L1.

Similarly, the first case part CS1 and the third case part CS3 are fastened to each other by a second fastening member B2 (here, a male screw) at projecting parts T projecting outwardly in the radial direction R from respective case outer peripheral walls. A second insertion hole 24 through which the second fastening member B2 penetrates is formed in the projecting part T of the third case part CS3, and a second female-screw hole 23 with which the second fastening member B2 is engaged threadedly is formed in the projecting part T of the first case part CS1. The first case part CS1 and the third case part CS3 are brought into contact with each other, and the second fastening member B2 is inserted into the second insertion hole 24 along the axial direction L from the axial-direction second side L2 toward the axial-direction first side L1 such that the second fastening member B2 is engaged threadedly with the second female-screw hole 23. Hereby, a second joining surface J2 is formed in a close contact manner such that the first case part CS1 and the third case part CS3 are joined to each other. Note that an insertion hole through which the second fastening member B2 penetrates may be formed in the projecting part T of the first case part CS1, and a female-screw hole with which the second fastening member B2 is engaged threadedly may be formed in the projecting part T of the second case part CS2 such that the second fastening member B2 is inserted along the axial direction L from the axial-direction first side L1 toward the axial-direction second side L2.

The case CS constituted by three members can be formed such that the three members are joined at two joining surfaces of the first joining surface J1 as a joining surface between the first case part CS1 and the second case part CS2 and the second joining surface J2 as a joining surface between the first case part CS1 and the third case part CS3. That is, since the case CS is formed with a small number of joining surfaces, the number of parts projecting in the radial direction R in the case CS to form joining surfaces is reduced. As a result, upsizing of the dimension of the whole case CS in the radial direction R is restrained, so that a space where other members are placed is easily secured outside the case CS. For example, a rotary electric machine control device including an inverter for driving the first rotary electric machine 1A and the second rotary electric machine 1B can be placed in the vicinity of a target rotary electric machine to be controlled. That is, it is possible to downsize the vehicle drive device 100 and to also improve the mountability of other members to be placed near the vehicle drive device.

Note that the first case part CS1 and the second case part CS2 are joined to each other in a state where the first joining surface J1 is sealed by a sealing member, and the first case part CS1 and the third case part CS3 are joined to each other in a state where the second joining surface J2 is sealed by a sealing member. Hereby, the case CS can be configured in a sealed state. As described above, in the present embodiment, the case CS is formed by joining three members at two joining surfaces of the first joining surface J1 and the second joining surface J2. Accordingly, the sealing members should be just provided in the two joining surfaces, and the amount of the sealing members to be used can be restrained. Further, the man-hour for assembling the case CS can be also restrained.

Further, the first joining surface J1 is placed closer to the axial-direction first side L1 than the first support part S1, and the second joining surface J2 is placed closer to the axial-direction second side L2 than the first support part S1. Since joined parts are placed to be distanced from the first support part S1 along the axial direction L, a space is easily secured outside the first support part S1 in the radial direction R in the case CS. Accordingly, in a case where the vehicle drive device 100 is provided in a vehicle, a space for members other than the vehicle drive device 100 to be provided in the vehicle is easily secured.

The first rotary electric machine 1A includes a first stator 11A and a first rotor 12A. The first stator 11A includes a first stator core 111A fixed to a nonrotatable member (herein, the first case part CS1). The first rotor 12A includes a first rotor core 121A rotatable relative to the first stator 11A. A first rotor shaft 13A extending along the axial direction L is connected to the first rotor core 121A in an integrally rotatable manner. Similarly, the second rotary electric machine 1B includes a second stator 11B and a second rotor 12B. The second stator 11B includes a second stator core 111B fixed to a nonrotatable member (herein, the first case part CS1). The second rotor 12B includes a second rotor core 121B rotatable relative to the second stator 11B. A second rotor shaft 13B extending along the axial direction L is connected to the second rotor core 121B in an integrally rotatable manner.

In the present embodiment, the first rotor 12A and a first input shaft 14A as a first input member configured to rotate integrally with the first rotor 12A are placed between the first support part S1 of the first case part CS1 and the first part C1 of the second case part CS2 in the axial direction L such that the first rotor 12A and the first input shaft 14A are supported by the first support part S1 and the first part C1. Further, the second rotor 12B and a second input shaft 14B as a second input member configured to rotate integrally with the second rotor 12B are placed between the first support part S1 of the first case part CS1 and the second part C2 of the third case part CS3 in the axial direction L such that the second rotor 12B and the second input shaft 14B are supported by the first support part S1 and the second part C2.

That is, the first rotor 12A and the first input shaft 14A are supported between the first case part CS1 and the second case part CS2, and the second rotor 12B and the second input shaft 14B are supported between the first case part CS1 and the third case part CS3. Hereby, while the case CS is constituted by a small number of members, the rotating bodies of the drive force sources and the input members to the power transmission device 3 can be supported by the case CS appropriately.

Note that, in the present embodiment, the first rotary electric machine 1A and the second rotary electric machine 1B are inner-rotor type rotary electric machines. Accordingly, the first rotor core 121A is placed inwardly from the first stator core 111A in the radial direction R, and the second rotor core 121B is placed inwardly from the second stator core 111B in the radial direction R. The first rotor shaft 13A is placed inwardly from the first rotor core 121A in the radial direction R, and the second rotor shaft 13B is placed inwardly from the second rotor core 121B in the radial direction R. Further, in the present embodiment, the first rotary electric machine 1A and the second rotary electric machine 1B are revolving-field type rotary electric machines. Accordingly, a first stator coil 112A is wound around the first stator core 111A such that coil end parts projecting toward the opposite sides (the axial-direction first side L1 and the axial-direction second side L2) in the axial direction L from the first stator core 111A are formed. Further, a second stator coil 112B is wound around the second stator core 111B such that coil end parts projecting toward the opposite sides (the axial-direction first side L1 and the axial-direction second side L2) in the axial direction L from the second stator core 111B are formed. Further, the first rotor core 121A is provided with a first permanent magnet 122A, and the second rotor core 121B is provided with a second permanent magnet 122B.

The first rotary electric machine 1A and the second rotary electric machine 1B are provided such that the first rotary electric machine 1A and the second rotary electric machine 1B are rotatable independently from each other. That is, the first rotor 12A and the second rotor 12B are connected such that the first rotor 12A and the second rotor 12B do not rotate integrally with each other, and the ratio of the rotation speed of the first rotor 12A to the rotation speed of the second rotor 12B changes in accordance with the state of the vehicle drive device 100. In the present embodiment, as the first rotary electric machine 1A and the second rotary electric machine 1B, two rotary electric machines having the same output characteristic are used. Note that, as the first rotary electric machine 1A and the second rotary electric machine 1B, rotary electric machines having different output characteristics may be used.

In the present embodiment, the first input shaft 14A extending along the axial direction L is connected to the first rotor shaft 13A in an integrally rotatable manner. The first input gear 4A is connected to the first input shaft 14A in an integrally rotatable manner. Thus, the first input gear 4A rotates integrally with the first rotor 12A of the first rotary electric machine 1A. That is, the first input gear 4A corresponds to the "first gear" configured to rotate integrally with the rotating body of the first drive force source.

Further, in the present embodiment, the second input shaft 14B extending along the axial direction L is connected to the second rotor shaft 13B in an integrally rotatable manner. The second input gear 4B is connected to the second input shaft 14B in an integrally rotatable manner. Thus, the second input gear 4B rotates integrally with the second rotor 12B of the second rotary electric machine 1B. That is, the second input gear 4B corresponds to a "second gear" configured to rotate integrally with the rotating body of the second drive force source.

As described above, the power transmission device 3 includes the first input gear 4A (the first gear), the second input gear 4B (the second gear), the first counter gear mechanism 5A, the second counter gear mechanism 5B, and the planetary gear mechanism 6. The first counter gear mechanism 5A includes a first counter input gear 51A (a third gear) and a first counter output gear 52A (a fourth gear), and the second counter gear mechanism 5B includes a second counter input gear 51B (a fifth gear) and a second counter output gear 52B (a sixth gear). As described later, the planetary gear mechanism 6 drivingly connects each of the first counter output gear 52A (the fourth gear) and the second counter output gear 52B (the sixth gear) to both the first output member 2A and the second output member 2B.

The first counter input gear 51A is an input element of the first counter gear mechanism 5A, and the second counter input gear 51B is an input element of the second counter gear mechanism 5B. The first counter input gear 51A meshes with the first input gear 4A, and the second counter input gear 51B meshes with the second input gear 4B. That is, the first counter input gear 51A corresponds to the "third gear" configured to mesh with the first gear (the first input gear 4A), and the second counter input gear 51B corresponds to the "fifth gear" configured to mesh with the second gear (the second input gear 4B).

The first counter output gear 52A is an output element of the first counter gear mechanism 5A, and the second counter output gear 52B is an output element of the second counter gear mechanism 5B. The first counter output gear 52A is connected to the first counter input gear 51A in an integrally rotatable manner, and the second counter output gear 52B is connected to the second counter input gear 51B in an integrally rotatable manner. That is, the first counter output gear 52A corresponds to the "fourth gear" configured to rotate integrally with the third gear (the first counter input gear 51A), and the second counter output gear 52B corresponds to the "sixth gear" configured to rotate integrally with the fifth gear (the second counter input gear 51B).

In the present embodiment, the first counter output gear 52A is connected to the first counter input gear 51A via a first counter shaft 53A extending in the axial direction L, and the second counter output gear 52B is connected to the second counter input gear 51B via a second counter shaft 53B extending in the axial direction L. Further, the first counter output gear 52A meshes with a first planetary input gear 7A of the planetary gear mechanism 6, and the second counter output gear 52B meshes with a second planetary input gear 7B of the planetary gear mechanism 6.

In the present embodiment, the first counter input gear 51A is larger in diameter than the first counter output gear 52A, and the second counter input gear 51B is larger in diameter than the second counter output gear 52B. The first counter input gear 51A and the second counter input gear 51B are placed between the first counter output gear 52A and the second counter output gear 52B in the axial direction L. Accordingly, in comparison with a configuration in which the first counter input gear 51A and the second counter input gear 51B are placed to sandwich the first counter output gear 52A and the second counter output gear 52B in the axial direction L, the planetary gear mechanism 6 can be easily placed closer to the first counter gear mechanism 5A and the second counter gear mechanism 5B in the radial direction R by avoiding interference of the first counter input gear 51A and the second counter input gear 51B having a large diameter with the planetary gear mechanism 6. Hereby, for example, the dimension of the vehicle drive device 100 in the radial direction R is restrained to be small, so that it is possible to easily downsize the vehicle drive device 100 more.

Further, the first input gear 4A, the second input gear 4B, the first counter gear mechanism 5A, and the second counter gear mechanism 5B are placed between the first rotary electric machine 1A and the second rotary electric machine 1B in the axial direction L. Hereby, the first counter gear mechanism 5A and the second counter gear mechanism 5B can be also easily placed to overlap with the first rotary electric machine 1A and the second rotary electric machine 1B in an axial view along the axial direction L, as well as the first input gear 4A and the second input gear 4B. Accordingly, the dimension of the vehicle drive device 100 in the radial direction R is restrained to be small, so that it is possible to easily downsize the vehicle drive device 100 more.

As illustrated in FIG. 1, the case CS further includes a first auxiliary member H1 and a second auxiliary member H2 placed in a case inner space E surrounded by the first case part CS1, the second case part CS2, and the third case part CS3. The first auxiliary member H1 includes a second support part S2 extending in the radial direction R, and the second auxiliary member H2 includes a third support part S3 extending in the radial direction R. More specifically, the first auxiliary member H1 is attached to the first case part CS1 such that the second support part S2 is placed between the first support part S1 and the first part C1 in the axial direction L. Further, the second auxiliary member H2 is attached to the first case part CS1 such that the third support part S3 is placed between the first support part S1 and the second part C2 in the axial direction L. The first counter gear mechanism 5A is placed between the first support part S1 and the second support part S2 in the axial direction L such that the first counter gear mechanism 5A is supported by the first support part S1 and the second support part S2. Further, the second counter gear mechanism 5B is placed between the first support part S1 and the third support part S3 in the axial direction L such that the second counter gear mechanism 5B is supported by the first support part S1 and the third support part S3.

Note that the first auxiliary member H1 and the second auxiliary member H2 are joined to the first case part CS1. For example, as illustrated in FIG. 1, the first auxiliary member H1 is joined to the first case part CS1 by fastening by a third fastening member B3 (e.g., a screw). Further, the second auxiliary member H2 is joined to the first case part CS1 by fastening by a fourth fastening member B4 (e.g., a screw).

The first auxiliary member H1 allows the second support part S2 to be provided appropriately between the first support part S1 and the first part C1 in the axial direction L, and the second auxiliary member H2 allows the third support part S3 to be provided appropriately between the first support part S1 and the second part C2 in the axial direction L. Hereby, the first counter gear mechanism 5A and the second counter gear mechanism 5B can be accommodated appropriately inwardly from the first case part CS1 in the radial direction R. The first rotary electric machine 1A and the second rotary electric machine 1B are placed on the first axis X1, and the first output member 2A, the second output member 2B, and the planetary gear mechanism 6 are placed on the second axis X2. Since the first counter gear mechanism 5A and the second counter gear mechanism 5B are placed on the third axis X3, the dimension of the vehicle drive device 100 in the axial direction L can be also restrained to be small, in comparison with a configuration in which the first counter gear mechanism 5A and the second counter gear mechanism 5B are placed on the first axis X1 or the second axis X2.

As described above, the first case part CS1 and the second case part CS2 are joined to each other in a state where the first joining surface J1 is sealed by a sealing member, and the first case part CS1 and the third case part CS3 are joined to each other in a state where the second joining surface J2 is sealed by a sealing member. Hereby, the case CS can be configured in a sealed state. In the meantime, the first auxiliary member H1 attached to the first case part CS1 is directly joined to the first case part CS1 without a sealing member. Further, the second auxiliary member H2 attached to the first case part CS1 is also directly joined to the first case part CS1 without a sealing member. Since the first auxiliary member H1 and the second auxiliary member H2 are provided in the case inner space E of the case CS, it is not necessary to perform sealing to restrain leakage of oil, immersion of water, or the like. Accordingly, even when the second support part S2 and the third support part S3 for supporting the first counter gear mechanism 5A and the second counter gear mechanism 5B are provided, the number of parts that require sealing does not increase because of this. Accordingly, an increase in a manufacturing cost is also restrained.

The first counter gear mechanism 5A changes the speed of the rotation of the first input gear 4A, and the second counter gear mechanism 5B changes the speed of the rotation of the second input gear 4B. The rotation of the first input gear 4A the speed of which is changed by the first counter gear mechanism 5A is input into the planetary gear mechanism 6 via the first planetary input gear 7A. Further, the rotation of the second input gear 4B the speed of which is changed by the second counter gear mechanism 5B is input into the planetary gear mechanism 6 via the second planetary input gear 7B. In the present embodiment, the first counter gear mechanism 5A transmits the rotation of the first input gear 4A to the first planetary input gear 7A by reducing the speed of the rotation of the first input gear 4A. Similarly, the second counter gear mechanism 5B transmits the rotation of the second input gear 4B to the second planetary input gear 7B by reducing the speed of the rotation of the second input gear 4B.

More specifically, in the present embodiment, the first counter input gear 51A is formed to be larger in diameter than the first input gear 4A, and the first counter output gear 52A is formed to be smaller in diameter than the first planetary input gear 7A. Accordingly, the speed of the rotation of the first input gear 4A is reduced in accordance with the gear ratio of the first input gear 4A to the first counter input gear 51A and further reduced in accordance with the gear ratio of the first counter output gear 52A to the first planetary input gear 7A (that is, the speed is reduced at two stages), and the rotation of the first input gear 4A is input into the planetary gear mechanism 6.

Similarly, in the present embodiment, the second counter input gear 51B is formed to be larger in diameter than the second input gear 4B, and the second counter output gear 52B is formed to be smaller in diameter than the second planetary input gear 7B. Accordingly, the speed of the rotation of the second input gear 4B is reduced in accordance with the gear ratio of the second input gear 4B to the second counter input gear 51B and further reduced in accordance with the gear ratio of the second counter output gear 52B to the second planetary input gear 7B (that is, the speed is reduced at two stages), and the rotation of the second input gear 4B is input into the planetary gear mechanism 6.

Note that, in the present embodiment, the first input gear 4A, the first counter input gear 51A, the first counter output gear 52A, the first planetary input gear 7A, the second input gear 4B, the second counter input gear 51B, the second counter output gear 52B, and the second planetary input gear 7B are helical gears.

As described above, the rotation of the first rotary electric machine 1A is input into the planetary gear mechanism 6 via the first counter gear mechanism 5A, and the rotation of the second rotary electric machine 1B is input into the planetary gear mechanism 6 via the second counter gear mechanism 5B. That is, the speed of a rotation to be input into the planetary gear mechanism 6 is changed such that the rotation speed of a rotating element of the planetary gear mechanism 6 achieves an appropriate rotation speed. Accordingly, it is possible to restrain the load of the planetary gear mechanism 6 to be small.

The planetary gear mechanism 6 includes a ring gear R6, a carrier C6 configured to rotatably support a first pinion gear P61 and a second pinion gear P62 that rotates integrally with the first pinion gear P61 and meshes with the ring gear R6, a first sun gear S61 meshing with the first pinion gear P61, and a second sun gear S62 meshing with the second pinion gear P62.

The ring gear R6 is connected to the first planetary input gear 7A meshing with the first counter output gear 52A in an integrally rotatable manner. The carrier C6 is connected to the first output member 2A in an integrally rotatable manner. The carrier C6 holds a pinion shaft P63 configured to rotatably support the first pinion gear P61 and the second pinion gear P62 from their inner sides in the radial direction R. The first pinion gear P61 and the second pinion gear P62 are placed on the same axis. Further, the first pinion gear P61 and the second pinion gear P62 are connected to each other in an integrally rotatable manner. The first pinion gear P61 and the second pinion gear P62 rotate on their respective axial centers and also rotate (revolve) around the second axis X2. Further, a plurality of pairs of the first pinion gear P61 and the second pinion gear P62 is provided along their revolution trajectories. In the present embodiment, the first pinion gear P61 is smaller in diameter than the second pinion gear P62.

The first sun gear S61 is connected to the second output member 2B in an integrally rotatable manner. In the present embodiment, the first sun gear S61 is connected to the second output member 2B via a first connecting shaft 9A extending along the axial direction L. The second sun gear S62 is connected, in an integrally rotatable manner, to the second planetary input gear 7B meshing with the second counter output gear 52B. In the present embodiment, the second sun gear S62 is connected to the second planetary input gear 7B via the second connecting shaft 9B. Note that, in the present embodiment, the first sun gear S61 is larger in diameter than the second sun gear S62.

As illustrated in FIG. 1, in the present embodiment, an arrangement region for the planetary gear mechanism 6 in the axial direction L overlaps with that of either one of the first rotary electric machine 1A and the second rotary electric machine 1B. In the present embodiment, the arrangement region for the planetary gear mechanism 6 in the axial direction L overlaps with the arrangement region for the first rotary electric machine 1A in the axial direction L. In the meantime, the arrangement region for the planetary gear mechanism 6 in the axial direction L does not overlap with the arrangement region for the second rotary electric machine 1B in the axial direction L. Further, in the present embodiment, the first counter output gear 52A is placed on the first rotary electric machine 1A side (the axial-direction first side L1) in the axial direction L from the first counter input gear 51A. The first pinion gear P61 is placed on the first rotary electric machine 1A side (the axial-direction first side L1) in the axial direction L from the second pinion gear P62.

As described above, the first counter gear mechanism 5A, the second counter gear mechanism 5B, the first input gear 4A, and the second input gear 4B constituting the power transmission device 3 are supported by the first support part S1. As illustrated in FIG. 1, the first output member 2A is supported by the first part C1, and the second output member 2B is supported by the second part C2. The power transmission device 3 is accommodated inside the case CS. Accordingly, when the power transmission device 3 is supported by the first support part S1 provided in the first case part CS1, the power transmission device 3 can be appropriately supported and accommodated inside the case CS. In the meantime, the first output member 2A drivingly connected to the first wheel W1 and the second output member 2B drivingly connected to the second wheel W2 are partially exposed to outside the case CS. Accordingly, when the first output member 2A is supported by the first part C1 and the second output member 2B is supported by the second part C2, it is possible to support the first output member 2A and the second output member 2B by the case CS and to partially expose the first output member 2A and the second output member 2B to outside the case (CS) such that the first output member 2A and the second output member 2B are drivingly connected to respective wheels.

Note that, in the present embodiment, the gear ratio of a power transmission path from the first rotary electric machine 1A to the first output member 2A is the same as the gear ratio of a power transmission path from the second rotary electric machine 1B to the second output member 2B. Further, in the present embodiment, the number of teeth of each gear (R6, P61, P62, S61, S62) constituting the planetary gear mechanism 6 is set to establish the following formula (1).

$$1/Zr = 1/Zs2 - 1/Zs1 \times Zp1/Zp2 \qquad (1)$$

Here, in the above formula (1), Zr indicates the number of teeth of the ring gear R6, Zp1 indicates the number of teeth of the first pinion gear P61, Zp2 indicates the number of teeth of the second pinion gear P62, Zs1 indicates the number of teeth of the first sun gear S61, and Zs2 indicates the number of teeth of the second sun gear S62.

Figure 3:
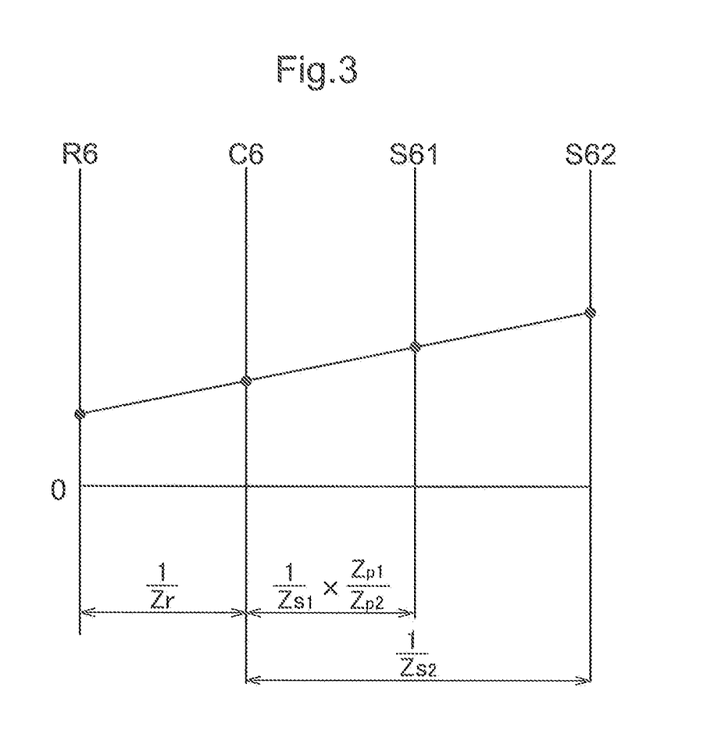
FIG. 3 is a velocity diagram of a planetary gear mechanism in the vehicle drive device.

FIG. 3 is a velocity diagram of the planetary gear mechanism 6. In the velocity diagram of FIG. 3, the vertical axis corresponds to the rotation speed of each of the rotating elements of the planetary gear mechanism 6. Each of a plurality of vertical lines arranged in parallel corresponds a corresponding one of the rotating elements of the planetary gear mechanism 6. As illustrated in FIG. 3, in the above formula (1), "1/Zr" indicates the gear ratio between the ring gear R6 and the carrier C6. Further, "1/Zs2" indicates the gear ratio between the second sun gear S62 and the carrier C6. Further, "1/Zs1×Zp1/Zp2" indicates the gear ratio between the first sun gear S61 and the carrier C6. Accordingly, "1/Zs2−1/Zs1×Zp1/Zp2" indicates the gear ratio between the second sun gear S62 and the first sun gear S61. That is, the above formula (1) indicates that the gear ratio between the ring gear R6 and the carrier C6 is the same as the gear ratio between the second sun gear S62 and the first sun gear S61.

Further, in the present embodiment, the gear ratio of the first counter gear mechanism 5A is the same as the gear ratio of the second counter gear mechanism 5B. That is, the first counter input gear 51A and the second counter input gear 51B have the same diameter, and the first counter output gear 52A and the second counter output gear 52B have the same diameter.

As described above, the first output member 2A is connected to the first wheel W1 in an integrally rotatable manner, and the second output member 2B is connected to the second wheel W2 in an integrally rotatable manner. Further, the carrier C6 is connected to the first output member 2A in an integrally rotatable manner, and the first sun gear S61 is connected to the second output member 2B in an integrally rotatable manner. Therefore, at the time when the vehicle provided with the vehicle drive device 100 moves straight, the rotation speed of the carrier C6 and the rotation speed of the first sun gear S61 are equal to each other, thereby establishing a state where four rotating elements included in the planetary gear mechanism 6 rotate at the same speed (that is, a state where the planetary gear mechanism 6 does not perform a differential operation). In the meantime, at the time when the vehicle turns, a state where the four rotating elements included in the planetary gear mechanism 6 rotate at speeds different from each other (that is, a state where the planetary gear mechanism 6 performs a differential operation) is established, as illustrated in one example in FIG. 3. FIG. 3 illustrates a state where the vehicle turns in a direction where the first wheel W1 becomes an inner wheel (a wheel on a side closer to the center of the turning).

That is, in the present embodiment, it is possible to appropriately control a torque difference between the first output member 2A and the second output member 2B by one planetary gear mechanism 6. Accordingly, the vehicle drive device 100 can have a simple configuration. As a result, it is possible to reduce a manufacturing cost for the vehicle drive device 100.

Note that the scene where the planetary gear mechanism 6 performs a differential operation is limited to the time when the vehicle turns. Since the scene where the planetary gear mechanism 6 performs a differential operation is limited to the time when the vehicle turns, an influence of gear noise that may be generated when the planetary gear mechanism 6 performs a differential operation can be restrained to be small. Further, in the present embodiment, each gear (R6, P61, P62, S61, S62) constituting the planetary gear mechanism 6 is a spur gear. In this case, a load to be applied to the each gear is mainly a radial load, so that a configuration for supporting the each gear in the axial direction L can be simplified.

Further, as illustrated in FIG. 1, in the axial direction L, an oil pump 20 is placed on the opposite side from the planetary gear mechanism 6 across the first counter output gear 52A and the second counter output gear 52B. In the present embodiment, it is possible to achieve an appropriate configuration for a vehicle drive device including the oil pump 20 without upsizing the vehicle drive device 100. In the present embodiment, an arrangement region for the oil pump 20 in the axial direction L overlaps with the arrangement region for the second rotary electric machine 1B in the axial direction L. As described above, the arrangement region for the planetary gear mechanism 6 in the axial direction L overlaps with the arrangement region for the first rotary electric machine 1A in the axial direction L. The planetary gear mechanism 6 and the oil pump 20 are placed to overlap with respective arrangement regions for the rotary electric machines in the axial direction L, so that the vehicle drive device 100 in which members are placed in a good balance in the axial direction L is achieved.

[Other Embodiments] The following describes other embodiments. Note that a configuration of each embodiment described below is not limited to a case where the configuration is applied solely, and the configuration can be applied in combination with configurations of other embodiments as long as any inconsistency does not occur.

(1) The above description deals with the embodiment in which the first input gear 4A, the second input gear 4B, the first counter gear mechanism 5A, and the second counter gear mechanism 5B are placed between the first rotary electric machine 1A and the second rotary electric machine 1B in the axial direction L. However, for example, the first counter gear mechanism 5A and the second counter gear mechanism 5B may be placed at positions overlapping with either one or both of the first rotary electric machine 1A and the second rotary electric machine 1B in a view along the radial direction R (a position where the arrangement positions in the axial direction L overlap with each other).

(2) The above description deals with the configuration in which the first counter input gear 51A is larger in diameter than the first counter output gear 52A, the second counter input gear 51B is larger in diameter than the second counter output gear 52B, and the first counter input gear 51A and the second counter input gear 51B are placed between the first counter output gear 52A and the second counter output gear 52B in the axial direction L. However, the disclosure here is not limited to such a configuration, and, for example, the first counter input gear 51A may be smaller in diameter than the first counter output gear 52A, and the second counter input gear 51B may be smaller in diameter than the second counter output gear 52B. In this case, it is preferable that the first counter output gear 52A and the second counter output gear 52B be placed between the first counter input gear 51A and the second counter input gear 51B in the axial direction L.

(3) The above description deals with the configuration in which the arrangement region for the planetary gear mechanism 6 in the axial direction L overlaps with either one of the first rotary electric machine 1A and the second rotary electric machine 1B. However, the disclosure is not limited to such a configuration, and the arrangement region for the planetary gear mechanism 6 in the axial direction L may not overlap with the arrangement region for either of the first rotary electric machine 1A and the second rotary electric machine 1B in the axial direction L. Alternatively, the arrangement region for the planetary gear mechanism 6 in the axial direction L may overlap with both of the arrangement regions for the first rotary electric machine 1A and the second rotary electric machine 1B in the axial direction L.

(4) The above description deals with the configuration in which the planetary gear mechanism 6 is placed to overlap with both the first counter gear mechanism 5A and the second counter gear mechanism 5B in an axial view along the axial direction L. However, the disclosure is not limited to such a configuration, and the planetary gear mechanism 6 may be placed so as to overlap with either one of the first counter gear mechanism 5A and the second counter gear mechanism 5B in an axial view along the axial direction L. Alternatively, the planetary gear mechanism 6 may be placed so as not to overlap with either of the first counter gear mechanism 5A and the second counter gear mechanism 5B in an axial view along the axial direction L.

(5) The above description deals with the configuration in which the gear ratio of the power transmission path from the first rotary electric machine 1A to the first output member 2A is the same as the gear ratio of the power transmission path from the second rotary electric machine 1B to the second output member 2B. However, the disclosure is not limited to such a configuration, and the gear ratio of the power transmission path from the first rotary electric machine 1A to the first output member 2A may be different from the gear ratio of the power transmission path from the second rotary electric machine 1B to the second output member 2B. In this case, the rotation speed of the first rotor 12A is different from the rotation speed of the second rotor 12B at the time when the vehicle provided with the vehicle drive device 100 moves straight. In order to deal with this, as the first rotary electric machine 1A and the second rotary electric machine 1B, rotary electric machines having different output characteristics may be used, for example.

(6) The above description deals with the configuration in which the gear ratio between the ring gear R6 and the carrier C6 is the same as the gear ratio between the second sun gear S62 and the first sun gear S61, and the gear ratio of the first counter gear mechanism 5A is the same as the gear ratio of the second counter gear mechanism 5B. However, the disclosure is not limited to such a configuration, and the gear ratio between the ring gear R6 and the carrier C6 may be different from the gear ratio between the second sun gear S62 and the first sun gear S61, and the gear ratio of the first counter gear mechanism 5A may be different from the gear ratio of the second counter gear mechanism 5B. This configuration is applicable in a case where the gear ratio of the power transmission path from the first rotary electric machine 1A to the first output member 2A is the same as or different from the gear ratio of the power transmission path from the second rotary electric machine 1B to the second output member 2B.

(7) The above description deals with, as an example, the configuration in which the number of teeth of each gear (R6, P61, P62, S61, S62) constituting the planetary gear mechanism 6 is set to establish the formula of "$1/Zr=1/Zs2-1/Zs1\times Zp1/Zp2$". However, the disclosure is not limited to such a configuration, and, for example, on the premise of "$Zp1=Zp2$", the number of teeth of each gear (R6, P61, P62, S61, S62) constituting the planetary gear mechanism 6 may be set to satisfy "$Zr:Zs2:Zs1=2:1:2$". Hereby, an output torque difference (the difference between torque to be output from the carrier C6 and torque to be output from the first sun gear S61) in the planetary gear mechanism 6 can be set to triple an input torque difference (the difference between torque to be input into the ring gear R6 and torque to be input into the second sun gear S62) in the planetary gear mechanism 6.

(8) The above description deals with, as an example, the configuration in which the first drive force source and the second drive force source are both rotary electric machines. However, the disclosure is not limited to such a configuration, and a drive force source other than the rotary electric machine is also usable as either one or both of the first drive force source and the second drive force source. As the drive force source to be used instead of the rotary electric machine, an internal combustion engine can be used, for example. Note that the internal combustion engine is a motor (a gasoline engine, a diesel engine, or the like) configured to be driven by combustion of fuel in the engine to generate power.

[Outline of Embodiment]

An outline of the vehicle drive device (100) described in the above description will be described briefly.

As one aspect, a vehicle drive device (100) is a vehicle drive device (100) including: a first drive force source (1A) including a first rotating body (12A); a second drive force source (1B) including a second rotating body (12B); a first output member (2A) drivingly connected to a first wheel (W1); a second output member (2B) drivingly connected to a second wheel (W2); and a case (CS) in which the first drive force source (1A), the second drive force source (1B), the first output member (2A), and the second output member (2B) are accommodated. The first drive force source (1A) and the second drive force source (1B) are placed on a first axis (X1). The first output member (2A) and the second output member (2B) are placed on a second axis (X2) different from the first axis (X1). The first axis (X1) and the second axis (X2) are placed in parallel to each other. When a direction perpendicular to the first axis (X1) and the second axis (X2) is taken as an axis perpendicular direction, the case (CS) includes: a first case part (CS1) having a first support part (S1) extending in the axis perpendicular direction, a second case part (CS2) having a first part (C1) that is a part extending in the axis perpendicular direction, and a third case part (CS3) having a second part (C2) that is a part extending in the axis perpendicular direction. The second case part (CS2) is joined to an axial-direction first side (L1) of the first case part (CS1), the third case part (CS3) is joined to an axial-direction second side (L2) of the first case part (CS1) that is opposite from the axial-direction first side (L1), the first rotating body (12A) and a first input member (14A) configured to rotate integrally with the first rotating body (12A) are placed between the first support part (S1) and the first part (C1) in an axial direction (L) in a state where the first rotating body (12A) and the first input member (14A) are supported by the first support part (S1) and the first part (C1), and the second rotating body (12B) and a second input member (14B) configured to rotate integrally with the second rotating body (12B) are placed between the first support part (S1) and the second part (C2) in the axial direction (L) in a state where the second rotating body (12B) and the second input member (14B) are supported by the first support part (S1) and the second part (C2).

With this configuration, the case (CS) constituted by three members can be formed such that the three members are joined at two joining surfaces of a joining surface between the first case part (CS1) and the second case part (CS2) and a joining surface between the first case part (CS1) and the third case part (CS3). That is, the number of parts that require sealing in the case (CS) can be reduced. Further, since the first rotating body (12A) and the first input member (14A) are supported between the first case part (CS1) and the second case part (CS2), and the second rotating body (12B) and the second input member (14B) are supported between the first case part (CS1) and the third case part (CS3), the case (CS) is constituted by a small number of members, and the rotating bodies of the drive force sources and the input members can be supported by the case (CS) appropriately. As such, with this configuration, it is possible to reduce the number of parts that require sealing in a case for a double-axis vehicle drive device including two drive force sources and to reduce a manufacturing cost for the vehicle drive device.

Here, it is preferable that the first drive force source (1A) be accommodated in the first case part (CS1) and the second case part (CS2), and the second drive force source (1B) be accommodated in the first case part (CS1) and the third case part (CS3).

With this configuration, while the case (CS) is constituted by three members of the first case part (CS1), the second case part (CS2), and the third case part (CS3), that is, a smaller number of members, two drive force sources can be accommodated in the case (CS) appropriately.

Further, it is preferable that the vehicle drive device (100) include a power transmission device (3) configured to transmit torque of the first drive force source (1A) to at least the first output member (2A) and transmit torque of the second drive force source (1B) to at least the second output member (2B), and it is preferable that the power transmission device (3) be accommodated in the first case part (CS1).

With this configuration, while the case (CS) is constituted by three members of the first case part (CS1), the second case part (CS2), and the third case part (CS3), that is, a smaller number of members, the power transmission mechanism (3) via which each of the two drive force sources is drivingly connected to each of the two output members can be accommodated in the case (CS) appropriately.

Further, in a case where the vehicle drive device (100) includes the power transmission device (3) configured to transmit torque of the first drive force source (1A) to at least the first output member (2A) and transmit torque of the second drive force source (1B) to at least the second output member (2B), it is preferable that the first output member (2A) be supported by the first part (C1), the second output member (2B) be supported by the second part (C2), and the power transmission device (3) be supported by the first support part (S1).

When the power transmission device (3) is supported by the first support part (S1) provided in the first case part (CS1), the power transmission device (3) can be appropriately supported and accommodated inside the case (CS). In the meantime, the first output member (2A) drivingly connected to the first wheel (W1) and the second output member (2B) drivingly connected to the second wheel (W2) are partially exposed to outside the case (CS). Accordingly, since the first output member (2A) is supported by the first part (C1) and the second output member (2B) is supported by the second part (C2), it is possible to support the first output member (2A) and the second output member (2B) by the case (CS) and to partially expose the first output member (2A) and the second output member (2B) to outside the case (CS) such that the first output member (2A) and the second output member (2B) are drivingly connected to respective wheels.

Further, in a case where the vehicle drive device (100) includes the power transmission device (3) configured to transmit torque of the first drive force source (1A) to at least the first output member (2A) and transmit torque of the second drive force source (1B) to at least the second output member (2B), it is preferable that the power transmission device (3) include a first gear (4A) provided in the first input member (14A), a second gear (4B) provided in the second input member (14B), a first counter gear mechanism (5A) including a third gear (51A) meshing with the first gear (4A) and a fourth gear (52A) configured to rotate integrally with the third gear (51A), a second counter gear mechanism (5B) including a fifth gear (51B) meshing with the second gear (4B) and a sixth gear (52B) configured to rotate integrally with the fifth gear (51B), and a differential gear mechanism (6) via which the fourth gear (52A) and the sixth gear (52B) are drivingly connected to the first output member (2A) and the second output member (2B). It is preferable that: the differential gear mechanism (6) be placed on the second axis (X2); the first counter gear mechanism (5A) and the second counter gear mechanism (5B) be placed on a third axis (X3) different from the first axis (X1) and the second axis (X2) and placed in parallel to the first axis (X1) and the second axis (X2); the case (CS) include a first auxiliary member (H1) and a second auxiliary member (H2) placed in a case inner space (E) surrounded by the first case part (CS1), the second case part (CS2), and the third case part (CS3); the first auxiliary member (H1) include a second support part (S2) extending in the axis perpendicular direction; the second auxiliary member (H2) include a third support part (S3) extending in the axis perpendicular direction; the first auxiliary member (H1) be attached to the first case part (CS1) such that the second support part (S2) is placed between the first support part (S1) and the first part (C1) in the axial direction (L); the second auxiliary member (H2) be attached to the first case part (CS1) such that the third support part (S3) is placed between the first support part (S1) and the second part (C2) in the axial direction (L); the first counter gear mechanism (5A) be placed between the first support part (S1) and the second support part (S2) in the axial direction (L) such that the first counter gear mechanism (5A) is supported by the first support part (S1) and the second support part (S2); and the second counter gear mechanism (5B) be placed between the first support part (S1) and the third support part (S3) in the axial direction (L) such that the second counter gear mechanism (5B) is supported by the first support part (S1) and the third support part (S3).

With this configuration, the first auxiliary member (H1) allows the second support part (S2) to be provided appropriately between the first support part (S1) and the first part (C1) in the axial direction (L), and the second auxiliary member (H2) allows the third support part (S3) to be provided appropriately between the first support part (S1) and the second part (C2) in the axial direction (L). Hereby, the first counter gear mechanism (5A) and the second counter gear mechanism (5B) can be appropriately accommodated inwardly from the first case part (CS1) in the radial direction (R). The first drive force source (1A) and the second drive force source (1B) are placed on the first axis (X1), and the first output member (2A), the second output member (2B), and the differential gear mechanism (6) are placed on the second axis (X2). Since the first counter gear mechanism (5A) and the second counter gear mechanism (5B) are placed on the third axis (X3), the dimension of the vehicle drive device (100) in the axial direction (L) can be also restrained to be small, in comparison with a configuration in which the first counter gear mechanism (5A) and the second counter gear mechanism (5B) are placed on the first axis (X1) or the second axis (X2).

Further, it is preferable that: the first case part (CS1) and the second case part (CS2) be joined to each other in a state where the first case part (CS1) and the second case part (CS2) are sealed by a sealing member; the first case part (CS1) and the third case part (CS3) be joined to each other in a state where the first case part (CS1) and the third case part (CS3) are sealed by a sealing member; the first auxiliary member (H1) be directly joined to the first case part (CS1) without a sealing member; and the second auxiliary member (H2) be directly joined to the first case part (CS1) without a sealing member.

Since the first case part (CS1) and the second case part (CS2) are joined to each other in a state where the first case part (CS1) and the second case part (CS2) are sealed by a sealing member, and the first case part (CS1) and the third case part (CS3) are joined to each other in a state where the first case part (CS1) and the third case part (CS3) are sealed by a sealing member, the case (CS) can be configured in a sealed state. In the meantime, the first auxiliary member (H1) is directly joined to the first case part (CS1) without a sealing member, and the second auxiliary member (H2) is also directly joined to the first case part (CS1) without a sealing member. Since the first auxiliary member (H1) and the second auxiliary member (H2) are provided in the case inner space (E) of the case (CS), it is not necessary to perform sealing so as to restrain leakage of oil, immersion of water, or the like. Accordingly, even when the second support part (S2) and the third support part (S3) for supporting the first counter gear mechanism (5A) and the second counter gear mechanism (5B) are provided, the number of parts that require sealing does not increase because of this. Accordingly, an increase in a manufacturing cost is also restrained.

DESCRIPTION OF REFERENCE NUMERALS

100: vehicle drive device, 1A: first rotary electric machine (first drive force source), 12A: first rotor (first rotating body), 1B: second rotary electric machine (second drive force source), 12B: second rotor (second rotating body), 2A: first output member, 2B: second output member, 3: power transmission device, 4A: first input gear (first gear), 4B: second input gear (second gear), 5A: first counter gear mechanism, 14A: first input shaft (first input member), 14B: second input shaft (second input member), 51A: first counter input gear (third gear), 52A: first counter output gear (fourth gear), 5B: second counter gear mechanism, 51B: second counter input gear (fifth gear), 52B: second counter output gear (sixth gear), 6: planetary gear mechanism (differential gear mechanism), C1: first part, C2: second part, CS: case, CS1: first case part, CS2: second case part, CS3: third case part, E: case inner space, H1: first auxiliary member, H2: second auxiliary member, L: axial direction, L1: axial-direction first side, L2: axial-direction second side, S1: first support part, S2: second support part. S3: third support part, X1: first axis, X2: second axis, X3: third axis, W1: first wheel, W2: second wheel.

The invention claimed is:

1. A vehicle drive device comprising:
 a first drive force source including a first rotating body;
 a second drive force source including a second rotating body;
 a first output member drivingly connected to a first wheel;
 a second output member drivingly connected to a second wheel; and
 a case in which the first drive force source, the second drive force source, the first output member, and the second output member are accommodated, wherein:
 the first drive force source and the second drive force source are placed on a first axis;
 the first output member and the second output member are placed on a second axis different from the first axis;
 the first axis and the second axis are placed in parallel to each other; and
 when a direction perpendicular to the first axis and the second axis is taken as an axis perpendicular direction and a direction parallel to the first axis and the second axis is taken as an axis parallel direction, the case is constituted by three members,
  a first case part having a first support part extending in the axis perpendicular direction, and a cylindrically-formed portion defining a first open end and a second open end opposite from the first open end in the axis parallel direction,
  a second case part having a cylindrically-formed portion defining an open end facing the first open end of the first case part, and a closed end opposite from the open end in the axis parallel direction and including a first part that is a part extending in the axis perpendicular direction, and
  a third case part having a cylindrically-formed portion defining an open end facing the second open end of the first case part, and a closed end opposite from the open end in the axis parallel direction and including a second part that is a part extending in the axis perpendicular direction;
 the second case part is joined to, in a state sealed by a first sealing member, the first side of the first case part;
 the third case part is joined to, in a state sealed by a second sealing member, the second side of the first case part;
 the first rotating body and a first input member configured to rotate integrally with the first rotating body are placed between the first support part and the first part in an axial direction in a state where the first rotating body and the first input member are supported by the first support part and the first part; and
 the second rotating body and a second input member configured to rotate integrally with the second rotating body are placed between the first support part and the second part in the axial direction in a state where the second rotating body and the second input member are supported by the first support part and the second part.

2. The vehicle drive device according to claim 1, wherein:
 the first drive force source is accommodated in the first case part and the second case part; and
 the second drive force source is accommodated in the first case part and the third case part.

3. The vehicle drive device according to claim 2, comprising a power transmission device configured to transmit torque of the first drive force source to at least the first output member and transmit torque of the second drive force source to at least the second output member, wherein the power transmission device is accommodated in the first case part.

4. The vehicle drive device according to claim 3, wherein:
 the first output member is supported by the first part;
 the second output member is supported by the second part; and
 the power transmission device is supported by the first support part.

5. The vehicle drive device according to claim 2, comprising a power transmission device configured to transmit torque of the first drive force source to at least the first output member and transmit torque of the second drive force source to at least the second output member, wherein:
 the first output member is supported by the first part;
 the second output member is supported by the second part; and
 the power transmission device is supported by the first support part.

6. The vehicle drive device according to claim 1, comprising a power transmission device configured to transmit torque of the first drive force source to at least the first output member and transmit torque of the second drive force source to at least the second output member, wherein:
 the power transmission device includes
  a first gear provided in the first input member,
  a second gear provided in the second input member,
  a first counter gear mechanism including a third gear meshing with the first gear and a fourth gear configured to rotate integrally with the third gear,
  a second counter gear mechanism including a fifth gear meshing with the second gear and a sixth gear configured to rotate integrally with the fifth gear, and
  a differential gear mechanism via which the fourth gear and the sixth gear are drivingly connected to the first output member and the second output member;
 the differential gear mechanism is placed on the second axis;
 the first counter gear mechanism and the second counter gear mechanism are placed on a third axis different from the first axis and the second axis and placed in parallel to the first axis and the second axis;
 the case includes a first auxiliary member and a second auxiliary member placed in a case inner space surrounded by the first case part, the second case part, and the third case part;
 the first auxiliary member includes a second support part extending in the axis perpendicular direction;
 the second auxiliary member includes a third support part extending in the axis perpendicular direction;
 the first auxiliary member is attached to the first case part such that the second support part is placed between the first support part and the first part in the axial direction;
 the second auxiliary member is attached to the first case part such that the third support part is placed between the first support part and the second part in the axial direction;
 the first counter gear mechanism is placed between the first support part and the second support part in the axial direction such that the first counter gear mechanism is supported by the first support part and the second support part; and the second counter gear mechanism is placed between the first support part and the third support part in the axial direction such that the second counter gear mechanism is supported by the first support part and the third support part.

7. The vehicle drive device according to claim 6, wherein:
the first auxiliary member is directly joined to the first case part without a sealing member; and
the second auxiliary member is directly joined to the first case part without a sealing member.

8. The vehicle drive device according to claim 1, comprising a power transmission device configured to transmit torque of the first drive force source to at least the first output member and transmit torque of the second drive force source to at least the second output member, wherein the power transmission device is accommodated in the first case part.

9. The vehicle drive device according to claim 8, wherein:
the first output member is supported by the first part;
the second output member is supported by the second part; and
the power transmission device is supported by the first support part.

10. The vehicle drive device according to claim 1, comprising a power transmission device configured to transmit torque of the first drive force source to at least the first output member and transmit torque of the second drive force source to at least the second output member, wherein:
the first output member is supported by the first part;
the second output member is supported by the second part; and
the power transmission device is supported by the first support part.

11. A vehicle drive device comprising:
a first drive force source including a first rotating body;
a second drive force source including a second rotating body;
a first output member drivingly connected to a first wheel;
a second output member drivingly connected to a second wheel; and
a case in which the first drive force source, the second drive force source, the first output member, and the second output member are accommodated, wherein:
the first drive force source and the second drive force source are placed on a first axis;
the first output member and the second output member are placed on a second axis different from the first axis;
the first axis and the second axis are placed in parallel to each other; and
when a direction perpendicular to the first axis and the second axis is taken as an axis perpendicular direction and a direction parallel to the first axis and the second axis is taken as an axis parallel direction, the case is constituted by three members,
a first case part having a first support part extending in the axis perpendicular direction, and a cylindrically-formed portion defining a first open end and a second open end opposite from the first open end in the axis parallel direction,
a second case part having a cylindrically-formed portion defining an open end facing the first open end of the first case part, and a closed end opposite from the open end in the axis parallel direction and including a first part that is a part extending in the axis perpendicular direction, and a third case part having a cylindrically-formed portion defining an open end facing the second open end of the first case part, and a closed end opposite from the open end in the axis parallel direction and including a second part that is a part extending in the axis perpendicular direction;
the first case part and the second case part are joined to each other in a state where a first joining surface is sealed by a first sealing member at the first side of the first case part;
the first case part and the third case part are joined to each other in a state where a second joining surface is sealed by a second sealing member at the second side of the first case part;
the case is formed by joining at two joining surfaces, the two joining surfaces being constituted by the first joining surface and second joining surface;
the first rotating body and a first input member configured to rotate integrally with the first rotating body are placed between the first support part and the first part in an axial direction in a state where the first rotating body and the first input member are supported by the first support part and the first part; and
the second rotating body and a second input member configured to rotate integrally with the second rotating body are placed between the first support part and the second part in the axial direction in a state where the second rotating body and the second input member are supported by the first support part and the second part.

12. A vehicle drive device comprising:
a first drive force source including a first rotating body;
a second drive force source including a second rotating body;
a first output member drivingly connected to a first wheel;
a second output member drivingly connected to a second wheel; and
a case in which the first drive force source, the second drive force source, the first output member, and the second output member are accommodated, wherein:
the first drive force source and the second drive force source are placed on a first axis;
the first output member and the second output member are placed on a second axis different from the first axis;
the first axis and the second axis are placed in parallel to each other; and
when a direction perpendicular to the first axis and the second axis is taken as an axis perpendicular direction, the case includes
a first case part having a first support part extending in the axis perpendicular direction,
a second case part having a first part that is a part extending in the axis perpendicular direction, and
a third case part having a second part that is a part extending in the axis perpendicular direction;
the second case part is joined to an axial-direction first side of the first case part;
the third case part is joined to an axial-direction second side of the first case part that is opposite from the axial-direction first side;
the first rotating body and a first input member configured to rotate integrally with the first rotating body are placed between the first support part and the first part in an axial direction in a state where the first rotating body and the first input member are supported by the first support part and the first part; and
the second rotating body and a second input member configured to rotate integrally with the second rotating body are placed between the first support part and the second part in the axial direction in a state where the second rotating body and the second input member are supported by the first support part and the second part, the vehicle drive device further comprising a power transmission device configured to transmit torque of the first drive force source to at least the first output member and transmit torque of the second drive force source to at least the second output member, wherein:

the power transmission device includes
- a first gear provided in the first input member,
- a second gear provided in the second input member,
- a first counter gear mechanism including a third gear meshing with the first gear and a fourth gear configured to rotate integrally with the third gear,
- a second counter gear mechanism including a fifth gear meshing with the second gear and a sixth gear configured to rotate integrally with the fifth gear, and
- a differential gear mechanism via which the fourth gear and the sixth gear are drivingly connected to the first output member and the second output member;

the differential gear mechanism is placed on the second axis;

the first counter gear mechanism and the second counter gear mechanism are placed on a third axis different from the first axis and the second axis and placed in parallel to the first axis and the second axis;

the case includes a first auxiliary member and a second auxiliary member placed in a case inner space surrounded by the first case part, the second case part, and the third case part;

the first auxiliary member includes a second support part extending in the axis perpendicular direction;

the second auxiliary member includes a third support part extending in the axis perpendicular direction;

the first auxiliary member is attached to the first case part such that the second support part is placed between the first support part and the first part in the axial direction;

the second auxiliary member is attached to the first case part such that the third support part is placed between the first support part and the second part in the axial direction;

the first counter gear mechanism is placed between the first support part and the second support part in the axial direction such that the first counter gear mechanism is supported by the first support part and the second support part; and the second counter gear mechanism is placed between the first support part and the third support part in the axial direction such that the second counter gear mechanism is supported by the first support part and the third support part.

* * * * *